United States Patent
Mortensen

(10) Patent No.: US 11,652,817 B1
(45) Date of Patent: *May 16, 2023

(54) SYSTEMS AND METHODS FOR UPGRADING AUTHENTICATION SYSTEMS

(71) Applicant: United Services Automobile Association (USAA), San Antonio, TX (US)

(72) Inventor: Maland Keith Mortensen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,086

(22) Filed: Nov. 23, 2021

Related U.S. Application Data

(63) Continuation of application No. 16/864,836, filed on May 1, 2020, now Pat. No. 11,218,475, which is a continuation of application No. 16/408,963, filed on May 10, 2019, now Pat. No. 10,645,082, which is a continuation of application No. 16/007,804, filed on Jun. 13, 2018, now Pat. No. 10,333,928, which is a continuation of application No. 15/457,764, filed on Mar. 13, 2017, now Pat. No. 10,021,097, which is a
(Continued)

(51) Int. Cl.
| | |
|---|---|
| *H04L 9/40* | (2022.01) |
| *G06F 21/32* | (2013.01) |
| *G06F 21/45* | (2013.01) |
| *H04L 9/32* | (2006.01) |
| *G06F 8/65* | (2018.01) |

(52) U.S. Cl.
CPC .......... *H04L 63/0861* (2013.01); *G06F 21/32* (2013.01); *G06F 21/45* (2013.01); *H04L 63/205* (2013.01); *G06F 8/65* (2013.01); *H04L 9/3231* (2013.01)

(58) Field of Classification Search
None
See application file for complete search history.

(56) References Cited

U.S. PATENT DOCUMENTS

| | | | |
|---|---|---|---|
| 5,241,594 A | 8/1993 | Kung | |
| 6,092,192 A * | 7/2000 | Kanevsky | ............... G06F 21/32 382/115 |

(Continued)

OTHER PUBLICATIONS

U.S. Appl. No. 16/864,836, filed May 1, 2020, Systems and Methods for Upgrading Authentication Systems.
(Continued)

*Primary Examiner* — Nelson S. Giddins
(74) *Attorney, Agent, or Firm* — Perkins Coie LLP

(57) ABSTRACT

The technology described herein discloses systems and methods for upgrading biometric authentication system. The system can receive first biometric information in connection with an authentication request from a user. The system can authenticate the user via a first authentication system by comparing the first biometric information received in connection with the authentication request with second biometric information. The user can be automatically enrolled into a second authentication system using the first biometric information received in connection with the authentication request.

20 Claims, 8 Drawing Sheets

Related U.S. Application Data continuation of application No. 14/308,090, filed on Jun. 18, 2014, now Pat. No. 9,619,633.

(56) References Cited

U.S. PATENT DOCUMENTS

| | | |
|---|---|---|
| 6,766,040 B1 | 7/2004 | Catalano et al. |
| 7,542,590 B1 | 6/2009 | Robinson et al. |
| 7,698,322 B1 | 4/2010 | Langley |
| 7,805,614 B2 | 9/2010 | Aull et al. |
| 7,876,928 B2 | 1/2011 | Ito et al. |
| 8,145,915 B2 | 3/2012 | Milgramm |
| 8,713,658 B1 | 4/2014 | Tidd |
| 8,898,758 B2 | 11/2014 | Steeves et al. |
| 9,043,890 B1 | 5/2015 | Luo et al. |
| 9,230,092 B1 | 1/2016 | Juels |
| 9,294,279 B2 | 3/2016 | Buer et al. |
| 9,619,633 B1 | 4/2017 | Mortensen |
| 9,641,502 B2 | 5/2017 | Steeves et al. |
| 10,021,097 B1 | 7/2018 | Mortensen |
| 10,333,928 B1 | 6/2019 | Mortensen |
| 10,645,082 B1 | 5/2020 | Mortensen |
| 2006/0110011 A1 | 5/2006 | Cohen et al. |
| 2006/0120577 A1 | 6/2006 | Shinzaki et al. |
| 2006/0288234 A1 | 12/2006 | Azar et al. |
| 2007/0061590 A1 | 3/2007 | Boye et al. |
| 2007/0198435 A1 | 8/2007 | Siegal et al. |
| 2007/0283165 A1 | 12/2007 | Milgramm et al. |
| 2007/0294540 A1 | 12/2007 | Wadayama |
| 2008/0010673 A1 | 1/2008 | Makino et al. |
| 2010/0117791 A1 | 5/2010 | Inoue et al. |
| 2010/0186083 A1 | 7/2010 | Shinzaki et al. |
| 2010/0214062 A1 | 8/2010 | Hayashida |
| 2010/0263038 A1 | 10/2010 | Nagatomo |
| 2010/0275258 A1 | 10/2010 | Kamakura |
| 2011/0099385 A1 | 4/2011 | Takahashi |
| 2011/0138187 A1* | 6/2011 | Kaga ............... G06F 21/32 713/186 |
| 2011/0202985 A1 | 8/2011 | Kamakura |
| 2012/0005736 A1* | 1/2012 | Takahashi ............... G06F 21/32 726/7 |
| 2012/0042171 A1 | 2/2012 | White et al. |
| 2012/0079579 A1 | 3/2012 | Kamakura |
| 2012/0291111 A1 | 11/2012 | Kamakura |
| 2012/0314911 A1 | 12/2012 | Paul et al. |
| 2013/0207779 A1 | 8/2013 | Uno et al. |
| 2014/0007210 A1 | 1/2014 | Murakami et al. |
| 2014/0068723 A1 | 3/2014 | Grim et al. |
| 2014/0101434 A1 | 4/2014 | Senthurpandi et al. |
| 2014/0101453 A1 | 4/2014 | Senthurpandi |
| 2014/0143847 A1 | 5/2014 | Tidd |
| 2014/0223522 A1 | 8/2014 | Steeves et al. |
| 2014/0331060 A1 | 11/2014 | Hayton |
| 2015/0046990 A1 | 2/2015 | Oberheide et al. |
| 2015/0143545 A1 | 5/2015 | Falk et al. |
| 2015/0200935 A1 | 7/2015 | Ikeda et al. |
| 2015/0235017 A1 | 8/2015 | Oberheide et al. |
| 2015/0281200 A1 | 10/2015 | Steeves et al. |
| 2016/0277400 A1 | 9/2016 | Maurya et al. |
| 2017/0039368 A1 | 2/2017 | Grobman et al. |
| 2017/0208061 A1 | 7/2017 | Steeves et al. |

OTHER PUBLICATIONS

U.S. Appl. No. 16/408,963, U.S. Pat. No. 10,645,082, filed May 10, 2019, May 5, 2020, Systems and Methods for Upgrading Authentication Systems.

U.S. Appl. No. 16/007,804, U.S. Pat. No. 10,333,928, filed Jun. 13, 2018, Jun. 25, 2029, Systems and Methods for Upgrading Authentication Systems.

U.S. Appl. No. 15/457,764, U.S. Pat. No. 10,021,097, filed Mar. 13, 2017, Jul. 10, 2018, Systems and Methods for Upgrading Authentication Systems.

U.S. Appl. No. 14/308,090, U.S. Pat. No. 9,619,633, filed Jun. 18, 2014, Apr. 11, 2017, Systems and Methods for Upgrading Authentication Systems.

* cited by examiner

SYSTEMS AND METHODS FOR UPGRADING AUTHENTICATION SYSTEMS

CROSS-REFERENCE TO RELATED APPLICATIONS

This application is a continuation of U.S. patent application Ser. No. 16/864,836, filed May 1, 2020, now allowed, which is a continuation of U.S. patent application Ser. No. 16/408,963, entitled "SYSTEMS AND METHODS FOR UPGRADING AUTHENTICATION SYSTEMS," filed May 10, 2019, issued as U.S. Pat. No. 10,645,082 on May 5, 2020, which is a continuation of U.S. patent application Ser. No. 16/007,804, entitled "SYSTEMS AND METHODS FOR UPGRADING AUTHENTICATION SYSTEMS", filed Jun. 13, 2018, issued as U.S. Pat. No. 10,333,928 on Jun. 25, 2019, which is a continuation of U.S. patent application Ser. No. 15/457,764, entitled "SYSTEMS AND METHODS FOR UPGRADING AUTHENTICATION SYSTEMS", filed Mar. 13, 2017, issued as U.S. Pat. No. 10,021,097 on Jul. 10, 2018, which is a continuation of U.S. patent application Ser. No. 14/308,090 entitled "SYSTEMS AND METHODS FOR UPGRADING AUTHENTICATION SYSTEMS," filed on Jun. 18, 2014, issued as U.S. Pat. No. 9,619,633 on Apr. 11, 2017, all of which are hereby incorporated by reference for all purposes in their entireties.

TECHNICAL FIELD

Various embodiments of the present disclosure generally relate to authentication. More specifically, various embodiments of the present disclosure relate to methods and systems for upgrading authentication systems.

BACKGROUND

The protection and security of customer information is vital from an organization's perspective, not only to comply with applicable laws, but to earn and keep a customer's trust. Enhanced security often comes at the cost of convenience for the user. For example, customers may be required to set up passwords, identify an image, answer additional security questions, provide biometric data, etc. to be authenticated to a website or to participate in certain activities.

BRIEF DESCRIPTION OF THE DRAWINGS

Embodiments of the present disclosure will be described and explained through the use of the accompanying drawings in which.

Figure 1:
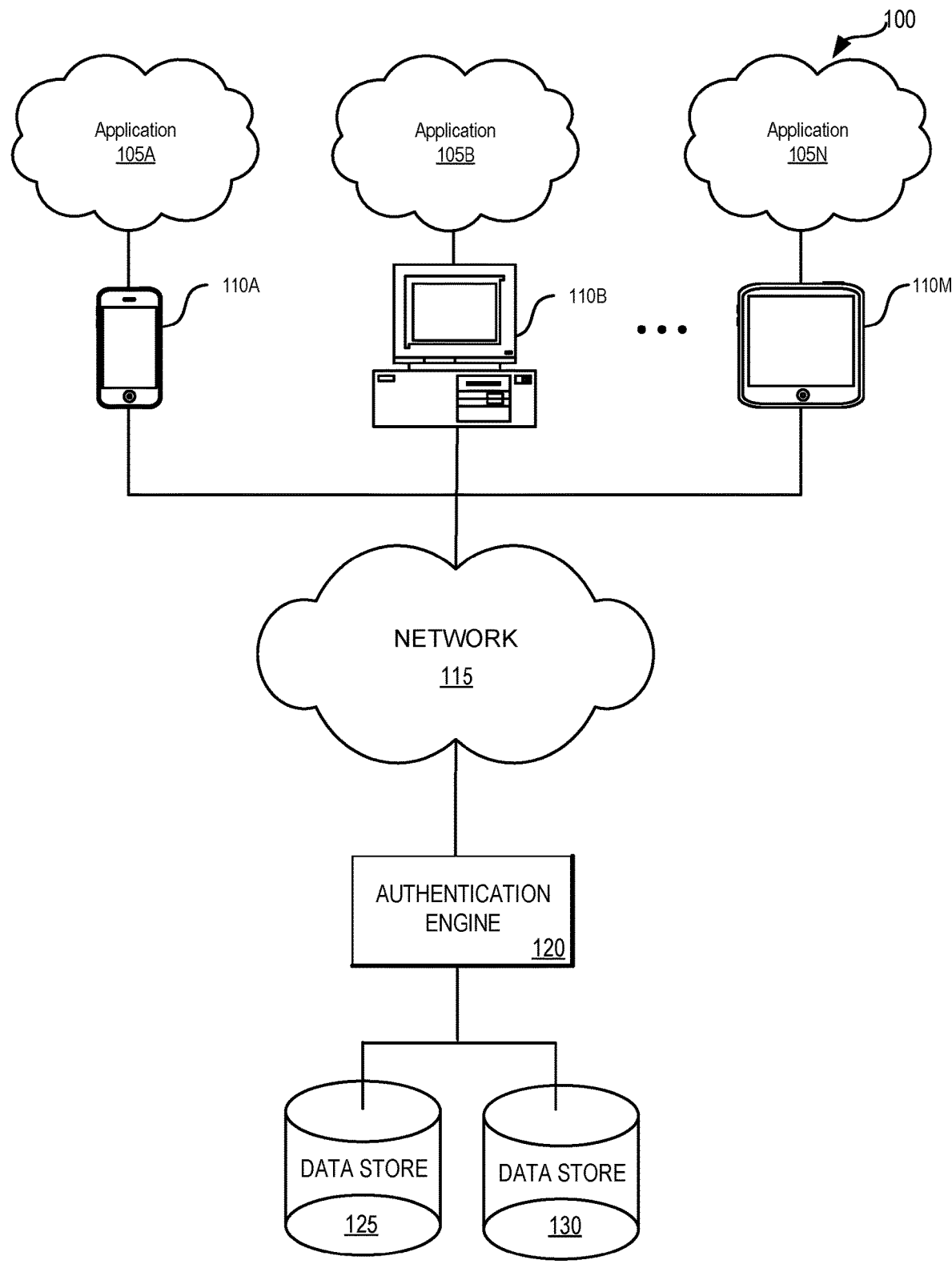
FIG. 1 illustrates an example of a network-based operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to authentication. More specifically, various embodiments of the present disclosure relate to methods and systems for upgrading authentication systems Both hardware and software components of computer systems are often upgraded to accommodate new or improved, technology, algorithms, features, interfaces, protocols, standards, and/or other types of improvements. These upgrades pose many hurdles for companies, particularly with respect to authentication systems which may not be backwards compatible. For example, the biometric information submitted by a user during a registration process may not be permanently stored. Rather, algorithms are used to analyze the biometric information and to create a user profile or characteristics of the biometric information. After creation of the user profile or characteristics of the biometric information, the biometric information itself is permanently deleted from temporary storage. As a result, organizations are not storing unnecessary sensitive information that could pose a serious security concerns but still have sufficient data to verify the identity of the user.

Upgrading biometric systems may be problematic because the existing analysis on enrollment data generated by the historic system to create a user profile or characteristics associated with the user (e.g., a first biometric algorithm may be used) may not be compatible with the analysis generated by the upgraded biometric authentication system (e.g., a second biometric algorithm may be used). Various types of upgrades may occur, including, but not limited to, software upgrades, hardware upgrades, and security changes.

Embodiments described in the disclosure may also be applied during password updates. In some scenarios, websites access one or more java virtual machines (JVMs) that require a user's password to access information. For example, a user may login to a website by providing a username and a password. To access information requested by the user such as an account balance, the JVM must submit the user's password (or a hashed password) that is stored on the system. The JVMs may check for an updated password periodically (e.g., every few hours). Thus, when a user changes a password, the new password may not be updated immediately in the system, creating issues when the user attempts to access information because the JVM will be using the old password to access the information. Systems and methods described herein contemplate allowing the system to store two (or more) passwords in parallel until the JVMs have accessed the updated passwords.

For systems that don not store biometric information, users have traditionally been required to repeat an enrollment process to enroll into the upgraded authentication system. For example, users may be asked to provide biometric enrollment data or the biometric information previously provided has to be stored for more than a short period of time (e.g., more than a day). Neither of these are acceptable solutions because customers may be inconvenienced by being asked to provide biometric enrollment data multiple times and because storing a user's enrollment data as opposed to the characteristics may pose security risks. With the increasing scrutiny on security and data protection and the risks associated with storing sensitive information, many organizations are hesitant to store a user's biometric information.

In contrast, various embodiments allow a user to be enrolled in the second system without being asked to provide additional enrollment data (e.g., repeatedly asking for biometric samples of the same type) and without storing biometric samples for more than a temporary period of time.

In some embodiments, a first authentication system and a second authentication system are run in parallel, with the eventual goal of replacing the first system with the second system after a majority of users are enrolled in the second system and/or after a period of time. When an authentication request that includes biometric information (e.g., an image) is received, the authentication request is routed to the first authentication system if the user is not yet enrolled in the second authentication system. The user is authenticated using the first authentication system using the authentication systems and algorithms of the first authentication system. For example, the user may be authenticated by comparing characteristics generated from the image received in the authentication request with characteristics generated from a previously collected image (e.g., collected during an enrollment process).

Once the user is authenticated using the first authentication system, the image received in the authentication request as part of the authentication process can be used to automatically enroll the user by creating a second user profile or second characteristic set that can be used during authentication by the second authentication system. Since the image used to enroll the user into the first authentication system is not stored, a confirmed image is needed to enroll the user in the second authentication system. The image received in the authentication request can be used because the first authentication system has verified that the image is valid.

The second authentication system generates characteristics from the biometric information received in the authentication request, which may be used to automatically enroll the user in the second system. A database keeping track of the user's enrollment status may be updated with such information. The next time the user submits an authentication request, the user will be authenticated using the second authentication system.

Upon completion of the enrollment into the second system, the image used to enroll the user in the second system is deleted from temporary storage. Rather than storing the actual biometric information, the characteristics generated by the second system are stored as part of the enrollment data. Thus, the user can be enrolled in a second authentication system without storing biometric information for more than a transient period of time and without asking the user to provide an additional set of enrollment data.

In an example, a user may use a biometric authentication system to authenticate to a mobile wallet application on the user's mobile device. The biometric authentication system may be a part of a larger system (e.g., the mobile wallet application) or it may be a separate system. In order to access the user's mobile wallet to make a payment, transfer money, or participate in other transactions, the user provides biometric information, which is verified as part of an authentication process by the current biometric authentication system.

Should the current biometric authentication system be upgraded to a replacement biometric authentication system, there may be a transition period where the current biometric authentication system is operating in parallel with the replacement biometric authentication system. The first time (or other predetermined time) the user attempts to be authenticated to the mobile wallet application while the systems are running in parallel, the user will be authenticated to the mobile wallet application using the current biometric authentication system. After being authenticated to the current biometric authentication system, the biometric information received during the authentication request is communicated to the replacement authentication system to enroll the user in the upgraded biometric authentication system. During future authentication requests, the user will be authenticated to the mobile wallet application using the replacement authentication system. Thus, using some embodiments described herein, the user's biometric authentication system on the user's mobile wallet may be upgraded without the user having to take any action.

In some embodiments, the first system and the second system use different biometrics to authenticate the user. For example, if the first system authenticates with an image of the user's face, the user may be automatically enrolled in a second system that authenticates with a portion of the face such as an iris. In another example, the first system may require both face and voice for authentication whereas the second system requires on voice for authentication.

The biometric authentication systems may reside on the client-side, server-side or both. For example, if the client-side device analyzes the biometric information (e.g., creates the characteristics) instead of simply collecting the biometric information, then the biometric information received from the user may be analyzed on the client-side and the analyzed biometric information may be communicated to the server-side for authentication. In some embodiments, the user is authenticated on the client side. Thereafter, the client-side device may send a message informing the server-side that the user has been authenticated. The replacement authentication system on the client-side may receive the biometric information from the current authentication system and analyze the biometric information using the biometric algorithm in the replacement authentication system. In some embodiments, the biometric information as well as the characteristics of the biometric information are sent to the server-side and in other embodiments, only the characteristics are sent.

Biometrics, including voice, facial, fingerprint, and behavioral, among others, are specifically image or facial recognition biometrics, which are specifically discussed in many examples in the description, but these examples are not meant to be limiting. Rather, the techniques and components discussed in this description may be used during system upgrades for other types of information that an organization does not want to store or request again, such as passwords.

In the following description, for the purposes of explanation, numerous specific details are set forth in order to provide a thorough understanding of embodiments of the present disclosure. It will be apparent upon reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device, a mobile phone, a tablet computer, a mobile media device, a mobile gaming device, a vehicle-based computer, a dedicated terminal, a public terminal, desktop, or laptop computer, a kiosk, ATM, camera, etc.). In some embodiments, applications 105A-105N may be stored on the computing device or may be stored remotely. These computing devices can include mechanisms for receiving and sending traffic by connecting through network 115 to authentication engine 120 and data stores 125 and 130.

Computing devices 110A-110M may be configured to communicate via the network 115 with authentication engine 120. In some embodiments, computing devices 110A-110M can retrieve or submit information to authentication engine 120 and run one or more applications with customized content retrieved by authentication engine 120 and data stores 125 and 130. For example, computing devices 110A-110M can execute a browser application or a customized client to enable interaction between the computing devices 110A-110M and authentication engine 120 and data stores 125 and 130.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (Ipsec).

Authentication engine 120 can be running on one or more servers and can be used to authenticate users to a mobile application, website, to perform a specific activity, or for other activities. Authentication engine 120 may be communicably coupled with data stores 125 and 130 and computing devices 110A-110M. Authentication engine 120 may communicate, access, or receive data (e.g., user profiles including biometric user profiles, verification information, authentication services, etc.) from computing devices 110A-110M and data stores 125 and 130. Authentication engine 120 may be associated with a membership organization and the users may be members or potential members of the membership organization. The organization may be a financial institution and/or an insurance company.

Authentication may be based on information received through various user interfaces running on computing devices 110A-110M or other interactions, communications, and/or other inputs (e.g., e-mails, tokens, and/or communications via other channels). Authentication engine 120 can be calibrated/configured by individual companies or service providers based on risk tolerance and/or other business objectives to authenticate users.

In some cases, authentication to an application, process, website, or activity may be based on different criteria. For example, in addition to rendering an authentication decision, authentication engine 120 may be configured to compute a risk profile or score. That profile may be used by itself to make a decision, or it may be used in conjunction with other profiles, scores, and/or business practices. Authentication engine 120 may also be configured to recommend an access level the user should be granted. In some embodiments, authentication engine 120 includes various data processing and analytic tools that allow for implementation, creation, and evaluation of users and user information retrieved from data stores 125 and 130.

Data stores 125 and 130 can be used to manage storage and access to user data such as characteristics of biometric information, biometric profiles, enrollment status, registered user devices, user identifications, token IDs, financial information, authentication history, user preferences, member identification numbers, device fingerprints, personal identification numbers, and other information. Data stores 125 and 130 may be a data repository of a set of integrated objects that are modeled using classes defined in database schemas. Data stores 125 and 130 may further include flat files that can store data. Authentication engine 120 and/or other servers may collect and/or access data from the data stores 125 and 130.

Figure 2:
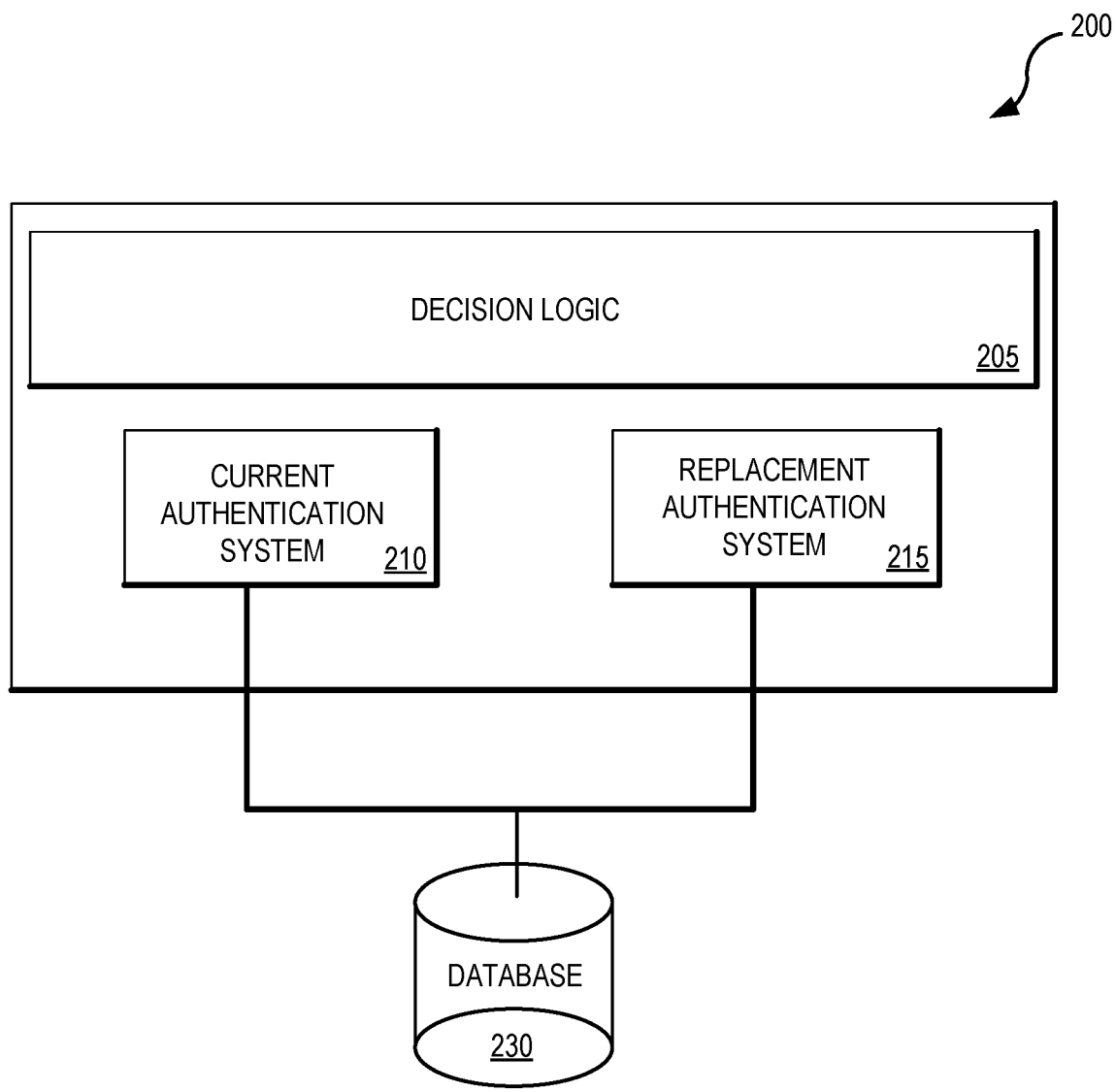
FIG. 2 illustrates various components of a system that may be used in accordance with one or more embodiments of the disclosure.

FIG. 2 illustrates various components of a system 200 that may be used in accordance with one or more embodiments of the disclosure. According to the embodiments shown in FIG. 2, system 200 can include decision logic 205, current authentication system 210, replacement authentication system 215, and database 230. Other components may be included in system 200. In some embodiments, decision logic may be implemented above current authentication system 210 and replacement authentication system 215. In other embodiments, some or all of the functionality of decision logic 205 may be integrated within current authentication system 210 and/or replacement system 215. In some embodiments, authentication engine 120 includes current authentication system 210 and replacement authentication system 215. In other embodiments, authentication engine 120 is separate from, but communicably coupled with current authentication system 210 and replacement authentication system 215.

Current authentication system 210 may be a currently used system for authenticating a user. The user may be authenticated to a mobile application, organization server, website portal and may enable the user to participate in activities (e.g., logon, view financial information, and transfer funds). Replacement authentication system 215 may be an authentication system that will replace current authentication system 210. In transitioning from the current authentication system 210 to replacement authentication system 215, current authentication system 210 may be run in parallel with replacement authentication system 215 until some desired criteria has been met. For example, the desired criteria may indicate that replacement authentication system 215 may be run in parallel until all users, a majority of users, or the regular users are enrolled in the replacement authentication system 215. In other embodiments, the desired criteria may indicate that replacement authentication system 215 may be run in parallel until a specified period of time expires (e.g., 2 months). The desired criteria may also be segmented based on various user characteristics (e.g., access levels, security levels, and the like). As a result, while the two authentication system may be run in parallel, some groups or segments of the population may be required to migrate at different rates based on desired criteria for those groups or segments.

For example, some customers may use current authentication system 210 to check account balances using a mobile application installed on the user's mobile device while others use current authentication system 210 to check account balances on their home computers. A security patch for current authentication system 210 may be available, requiring an update of current authentication system 210 to replacement authentication system 215. The mobile application users may be required to enroll in replacement authentication system 215 sooner than the home computer users because of certain security risks associated with the mobile application. In this case, a notification may be sent to mobile application users to authenticate using current authentication system 210 within a certain period of time. In other cases, the user may be required to provide new enrollment information without the option of authenticating using current authentication system 210.

Current authentication system 210 and replacement authentication system 215 may derive characteristics of the user from biometric information submitted by the user. These characteristics may be compared with characteristics derived from previously collected biometric information to authenticate (or deny authentication to) the user depending on a match of the compared characteristics. The algorithms used by these authentication systems to derive the characteristics may not be compatible so generally the characteristic data generated by the current authentication system 210 is compared only with characteristic data generated by the currently authentication system 210.

Characteristics of the user derived from received biometric information may be stored in database 230. Actual biometric information such as a photograph, image, fingerprint, voice sample, or other biometric information may be stored in database 230 for a transient period of time and may be deleted after characteristics are derived from the biometric information.

Decision logic 205 may determine which authentication system the authentication request should be routed to when an authentication request is received. This decision may be based on an enrollment status of the user (e.g., enrolled in current authentication system 210, enrolled in replacement authentication system 215, not enrolled in either authentication system). If the user is not enrolled in either authentication system, then enrollment steps may be taken to enroll the user in replacement authentication system 215 (e.g., collect enrollment information from the user). If the user is enrolled in replacement authentication system 215, decision logic 205 may route the authentication request to replacement authentication system 215.

If the user is not enrolled in the replacement authentication system 215 but is enrolled in the current authentication system 210, decision logic 205 may route the authentication request to current authentication system 210. Current authentication system 210 may authenticate the user using the process described above (i.e., generating characteristics and comparing the characteristics to the previously generated characteristics). When the user is authenticated using current authentication system 210, the user may be automatically enrolled in replacement authentication system 215. Automatically enrolling the user to replacement authentication system 215 may entail passing the biometric information (e.g., an image) received in the authentication request to replacement authentication system 215 and generating characteristics from the biometric information using replacement authentication system 215.

The characteristics generated from the biometric information using replacement authentication system 215 may be stored in database 230. These characteristics may be used to authenticate the user during future authentication requests. The biometric information received in the authentication request may be purged after then characteristics are generated.

Figure 3:
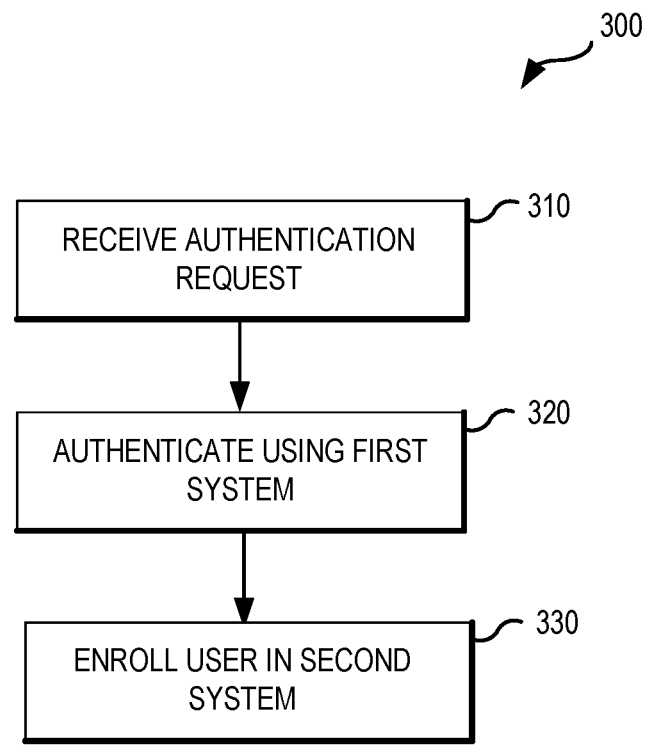
FIG. 3 is a flowchart illustrating a set of operations that can be used during a system upgrade in accordance with various embodiments of the present disclosure.

FIG. 3 is a flowchart 300 illustrating a set of operations that can be used during a system upgrade in accordance with various embodiments of the present disclosure. The steps illustrated in FIG. 3 may be performed by one or more components, devices, or modules such as, but not limited to, computing devices 110A-110M, authentication engine 120, current authentication system 210, replacement authentication system 215, or other components, modules, or devices. In some embodiments, fewer than all of the steps are performed, whereas in other embodiments additional operations are performed.

Receiving operation 310 receives an authentication request from a user. The authentication request may include biometric information such as an image. Authenticating operation 320 receives the biometric information and authenticates the user using a first system (e.g., current authentication system 210). The first system may generate characteristics of the biometric information and compare the characteristics with characteristics generated from previously collected biometric information. The characteristics may be extracted, generated, or derived using a first biometric algorithm associated with the first system.

Once the user is authenticated, enrolling operation 330 enrolls the user in a second system (e.g., replacement authentication system 215) using the biometric information received in the authentication request. Enrolling the user in the second system may include generating characteristics from the biometric information using a second biometric algorithm associated with the second system. The biometric information may be stored for a temporary period of time and deleted when the characteristics are generated from the biometric information using the second biometric algorithm.

Figure 4:
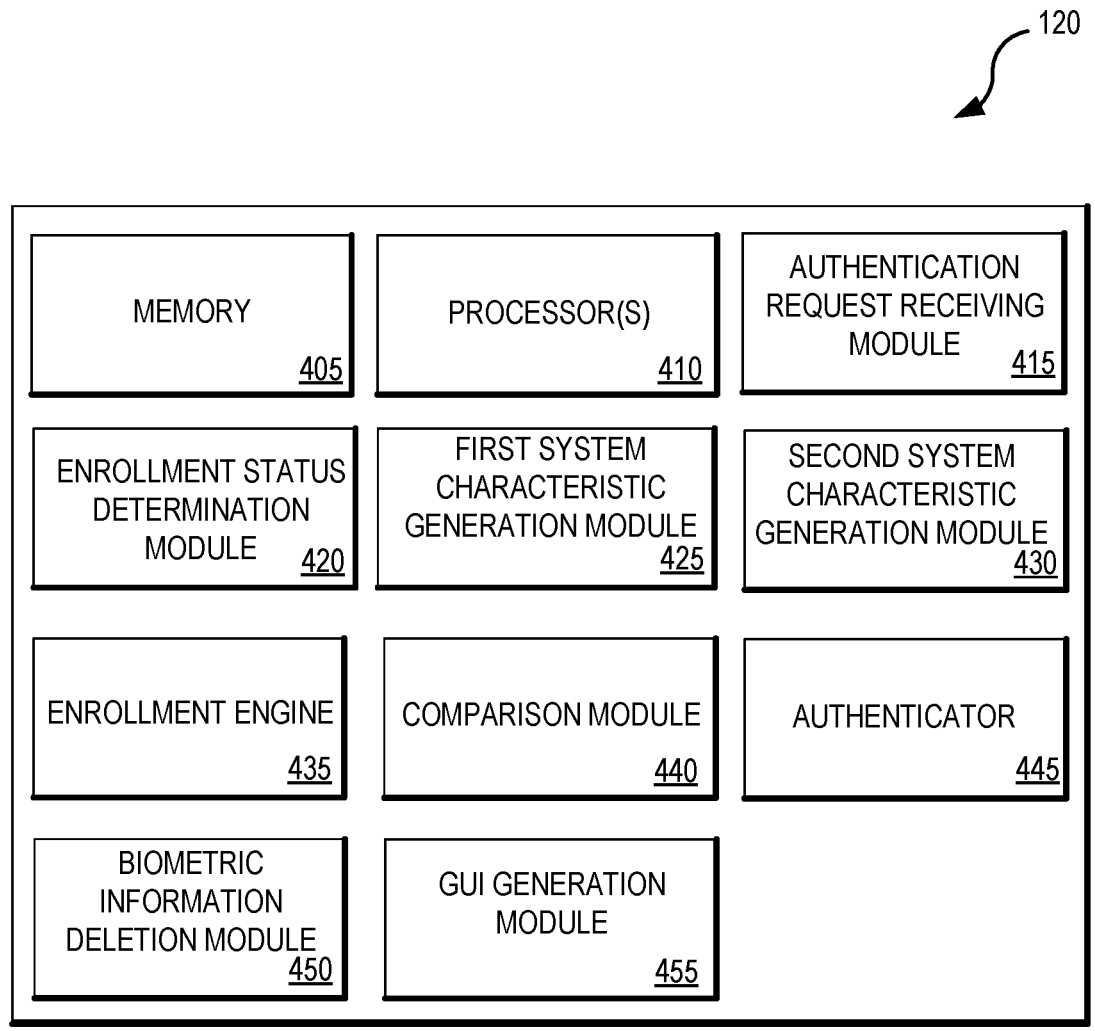
FIG. 4 illustrates various components of an authentication engine that may be used in accordance with various embodiments of the present disclosure.

FIG. 4 illustrates various components within authentication engine 120 according to one or more embodiments of the present disclosure. According to the embodiments shown in FIG. 4, authentication engine 120 can include memory 405, one or more processors 410, authentication request receiving module 415, enrollment status determination module 420, first system characteristic generation module 425, second system characteristic generation module 430, enrollment engine 435, comparison module 440, authenticator 445, biometric information deletion module 450, and GUI generation module 455.

Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, enrollment status determination module 420 and enrollment engine 435 can be combined in a single module for determining the enrollment status of the user and enrolling the user into a biometric authentication system.

Memory 405 can be any device, mechanism, or populated data structure used for storing information. In accordance with some embodiments of the present disclosure, memory 405 can encompass any type of, but is not limited to, volatile memory, nonvolatile memory, and dynamic memory. For example, memory 405 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 405.

Memory 405 may be used to store instructions for running one or more applications or modules on processor(s) 410. For example, memory 405 could be used in one or more embodiments to house all or some of the instructions needed to execute the functionality of authentication request receiving module 415, enrollment status determination module 420, first system characteristic generation module 425, second system characteristic generation module 430, enrollment engine 435, comparison module 440, authenticator 445, biometric information deletion module 450, and GUI generation module 455.

Authentication request receiving module 415 receives an authentication request to authenticate a user. The request may be a request to authenticate the user to a mobile application, a web portal, user account, and/or to perform an activity. Authentication request receiving module 415 may receive information included or associated with the authentication request. For example, the authentication request may include biometric information such as an image, photograph, fingerprint, voice sample, and/or behavioral biometric data. Other authentication information may include tokens, time stamps, token IDs, biometric samples, etc. embedded within the request or included with the request.

Authentication request receiving module 415 may communicate the authentication request to enrollment status determination module 420 to determine which authentication system, if any, the user is currently enrolled in. Authentication request receiving module 415 may direct the request, including the biometric information, to first system characteristic generation module 425, second system characteristic generation module 430, or enrollment engine 435, depending on the enrollment status of the user.

In some embodiments, authentication request receiving module 415 receives the request via other electronic communication mediums (i.e., channels). For example, the electronic communication containing the request can be sent via text message, e-mail, internet relay chat (IRC), file transfer protocol (FTP), hypertext transfer protocol (http), hypertext transfer protocol secure (https), or transmission control protocol/internet protocol (TCP/IP), among others.

Enrollment status determination module 420 receives an authentication request from authentication request receiving module 415 and determines which authentication system the user is enrolled in. The user may be enrolled in a first authentication system, a second authentication system, or neither authentication system. The first authentication system may be the currently used authentication system or first authentication system that will eventually be replaced by second authentication system and may be run in parallel with second authentication system while the transition is occurring.

If enrollment status determination module 420 determines that the user is not enrolled in either the first authentication system or the second authentication system, then authentication request receiving module 415 may send the authentication request to enrollment engine 435 so that enrollment steps may be taken to enroll the user in the second authentication system. Under these circumstances, since the user has not been enrolled in the first authentication system, typical enrollment steps may be taken including requesting biometric enrollment information from the user (e.g., the user may be required to provide voice samples speaking certain words several times). Biometric enrollment information can then be analyzed by the second system characteristic generation module 430 to enroll the user in the second authentication system.

If enrollment status determination module 420 determines that the user is enrolled in the second authentication system, authentication request receiving module 415 may route the authentication request to second system characteristic generation module 430. If enrollment status determination module 420 determines that the user is enrolled in the first authentication system but not in the second authentication system, authentication request receiving module 415 may communicate the authentication request to first system characteristic generation module 425.

First system characteristic generation module 425 analyzes biometric information to generate characteristics of the biometric information using a first biometric algorithm. First system characteristic generation module 425 may receive biometric information from authentication request receiving module 415 when enrollment status determination module 420 determines that the user is enrolled in the first authentication system and has not been enrolled in the second authentication system.

First system characteristic generation module 425 may generate characteristics from biometric information received during enrollment or interaction previous to the authentication request. Such characteristics may include a distance between eyes, a shade of eye color, a distance between nose and lips, length of ears, shape of eyes, tone of voice, cadence of speech, etc. When an authentication request is received by first system characteristic generation module 425, the first biometric algorithm generates characteristics using the biometric information received in the authentication request. These characteristics are communicated to the comparison module 440 so that these characteristics can be compared to characteristics derived from previously received biometric information.

Second system characteristic generation module 430 analyzes biometric information to generate characteristics of the biometric information using a second biometric algorithm. The second biometric algorithm may be different from the first biometric algorithm used in the first system characteristic generation module 425. The second biometric algorithm may generate characteristics that are similar to the characteristics that are generated using the first biometric algorithm discussed above. However, even though the same type of characteristics may be generated using the second biometric algorithm, the algorithms may be different such that characteristics generated from an image using the first biometric algorithm cannot be compared with characteristics generated from the same image using the second biometric algorithm. Thus, new enrollment information is needed for the second authentication system. Second system characteristic generation module 430 may receive an authentication request from authentication request receiving module 415 when enrollment status determination module 420 determines that the user is enrolled in the second authentication system.

When an authentication request is received into the second system characteristic generation module 430, the second biometric algorithm generates characteristics using the biometric information received in the authentication request. These characteristics are communicated to the comparison module 440 so that the characteristics derived from previously received biometric information can be compared with the characteristics derived from the biometric information received in the authentication request. The previously received biometric information may be biometric information received in an authentication request after the user has been authenticated using the first authentication system.

Enrollment engine 435 enrolls a user into the second authentication system by collecting enrollment information and associating the information with the user so that the user can be authenticated using the second authentication system. If the user is not enrolled in either the first authentication system or the second authentication system, enrollment engine 435 may request enrollment information from the user. Enrollment information may include biometric information such as a fingerprint, image, voice sample, etc. Enrollment engine 435 sends the enrollment information to the second authentication system where the second system characteristic generation module 430 analyzes the biometric information and completes the enrollment of the user.

If the user is enrolled in the first authentication system, the first biometric algorithm analyzes the biometric information received in the authentication request and the user is either authenticated or denied authentication by authenticator 445. If authenticator 445 authenticates the user, enrollment engine 435 passes the biometric information received by authentication request receive module 415 over to second system characteristic generation module 430. Second system characteristic generation module 430 may use the second biometric algorithm to generate the characteristics of the biometric information to which future authentication requests can be analyzed and compared against. In this way, the biometric information required for user enrollment into the second system is collected without requesting additional information from the user and without requiring permanent storage.

Comparison module 440 compares biometric information collected from authentication request receiving module 415 with biometric information previously collected. If the first authentication system is being used to authenticate the user, characteristics of biometric information generated by the first system characteristic generation module 425 are compared with characteristics generated from previously collected biometric information using first system characteristic generation module 425. If the second authentication system is being used to authenticate the user, characteristics of biometric information generated by the second system characteristic generation module 430 are compared with characteristics generated from previously collected biometric information using second system characteristic generation module 430. Comparison module 440 may communicate comparison information to authenticator 445.

Authenticator 445 may evaluate the comparison information received from comparison module 440 and other information, and determine whether the authentication request should be granted. The decision generated by authenticator 445 may be used in granting or denying access to an application or website. In some embodiments, the decision generated by authenticator 445 is used in granting or denying access to a restricted command, capability, or information. Examples of restricted commands include a command to log a person in to an account, a command to cause a transfer of funds from one account to a second account, and a command accessing restricted data, among others. Examples of accounts that a login command may log a user into include a social media account, an account at a financial institution, an account at a bank, an account at a credit union, an account at a merchant, a mobile wallet, an account at a service provider, or an account at a rental provider, among others.

Authenticator 445 can authenticate the user, deny the request for authentication, or request additional credentials based on the results from comparison module 440 and/or the type of activity being requested. For example, authenticator 445 may deny the request, for example, if the biometric samples do not match to at least a certain level, if fraud has been reported on the user's account, or if the user cannot provide additional authentication information when requested.

When the characteristics generated from the authentication request match the characteristics generated from the biometric information previously collected at or above a certain threshold, the user may be authenticated. The threshold may depend on the user, the activity the user is requesting, recent account activity, etc. For example, if the user is requesting a more risky transaction, then the matching threshold may be higher such that the characteristics generated from the biometric information previously collected, may closely resemble the characteristics generated from the authentication request. However, the threshold may be lower if the user has a pattern of participating in this type of request. In some embodiments, the same threshold applies to all users. Authenticator 445 communicates the results of the comparison (e.g., authenticated or not authenticated) to the user. If the user was authenticated using the first system characteristic generation module 425, then then the results are communicated to the enrollment engine 435 so that the user may be automatically enrolled in the second authentication system.

In some embodiments, when authenticator 445 determines that additional credentials are needed (e.g., the biometric match was close to meeting the level for authentication, the biometric sample was distorted, etc.), additional credentials may be requested.

In some embodiments, when a user submits biometric information to be authenticated via the first authentication system but cannot be authenticated, the user may be authenticated in other ways and still be enrolled automatically into the second authentication system. For example, if the user submits biometric information in an attempt to be authenticated via the first authentication system but fails because the user has not logged into the first authentication system in a significant amount of time, the user may be authenticated based on other information the user provides passively such as a device identification, location, social media, other biometrics, historical user information, and/or other identifying factors. Thus, even if the user is not authenticated using the first authentication system with the biometric information submitted by the user, the submitted biometric information may still be used to automatically enroll the user into the second authentication system. From the perspective of the user, the user was authenticated using the biometric information, whereas in reality the user was authenticated using different information, and the biometric information can still be used for enrollment into the second authentication system.

Biometric information deletion module 450 deletes the biometric authentication information received in the authentication request. The biometric authentication information may be stored only temporarily. Rather than storing the actual biometric information, the characteristics generated by the second system characteristic generation module 430 are stored on a long-term basis as enrollment data. Thus, the user can be enrolled in a second authentication system without storing biometric information for more than a transient period of time and without requesting additional enrollment information from the user.

GUI generation module 455 can generate one or more GUI screens that allow for interaction with a user of the authentication engine 120. In at least one embodiment, GUI generation module 455 generates a graphical user interface allowing a user to capture biometric information, to set preferences, authentication standards, rules, constraints, customize messages, and/or otherwise receive or convey information to the user.

Figure 5:
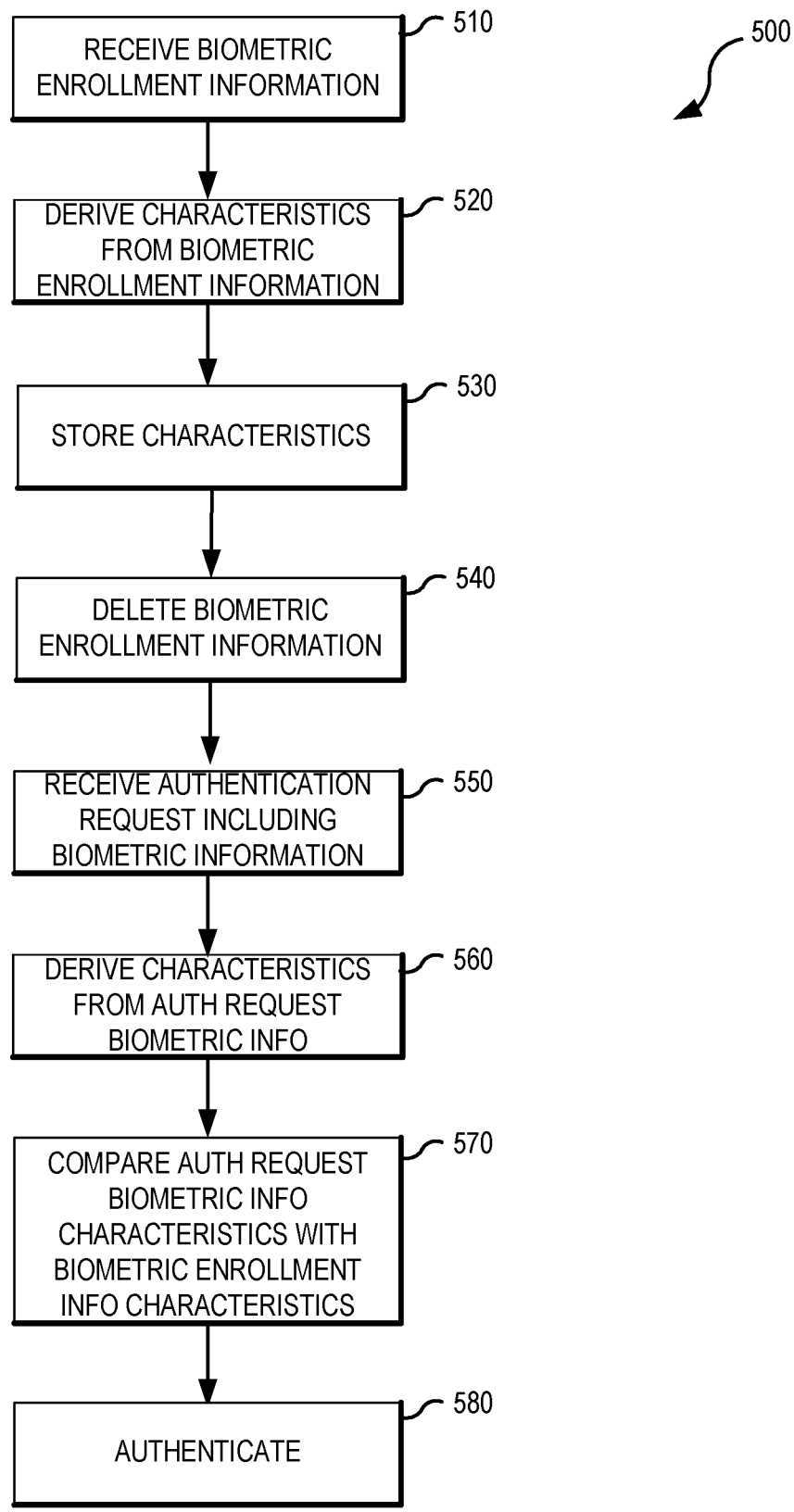
FIG. 5 is a diagram illustrating a registration and authentication process flow that may be used in authenticating a user in accordance with various embodiments of the present disclosure.

FIG. 5 is a diagram illustrating a registration and authentication process flow that may be used in authenticating a user in accordance with various embodiments of the present disclosure. The operations illustrated in FIG. 5 may be performed by one or more components, devices, or modules such as, but not limited to, computing devices 110A-110M, authentication engine 120, authentication request receiving module 415, enrollment status determination module 420, first system characteristic generation module 425, enrollment engine 435, comparison module 440, authenticator 445, biometric information deletion module 450, and GUI generation module 455 or other components or device. In some embodiments, fewer than all of the steps are performed, whereas in other embodiments additional operations are performed. Moreover, in some embodiments, the operations may be performed in different orders.

Receiving information 510 operation receives biometric enrollment information. Biometric enrollment information may include a voice sample, image of the user, fingerprint, video, etc. Deriving operation 520 derives characteristics from the biometric enrollment information. The characteristics may be derived by one or more algorithms that extract characteristics depending on the type of biometric information submitted. For example, if the biometric information is a voice sample, a cadence, tone, and accent, may be extracted, whereas, if the biometric information is an image, a distance between the nose and ears, shape of eyes, and length of forehead may be derived, whereas, if the biometric information is a fingerprint, a map of the fingerprint may be created.

Storing operation 530 stores the characteristics of the biometric information. Deleting operation 540 removes any stored biometric enrollment information from which the characteristics were derived. The deletion may occur when the characteristics have been derived, after a finite period of time regardless of whether the characteristics are extracted, or a different time period set by the organization.

Receiving operation 550 receives an authentication request that includes biometric information. In response to receiving the authentication request, deriving operation 560 may derive characteristics from the biometric information included in the authentication request. The characteristics derived from deriving operation 560 may be compared to the characteristics derived from the biometric enrollment information in comparing operation 570. Based on the results of the comparison, authentication operation 580 authenticates or denies authentication to the user. For example, if the characteristics from the comparison operation match to a certain threshold, the user may be authenticated. If the match does not meet the threshold, then the user may be denied authentication and/or additional authentication may be requested. In some embodiments, the threshold of a match required is predetermined. In some embodiments, the threshold may vary with the user, activity, or other factors.

Figure 6:
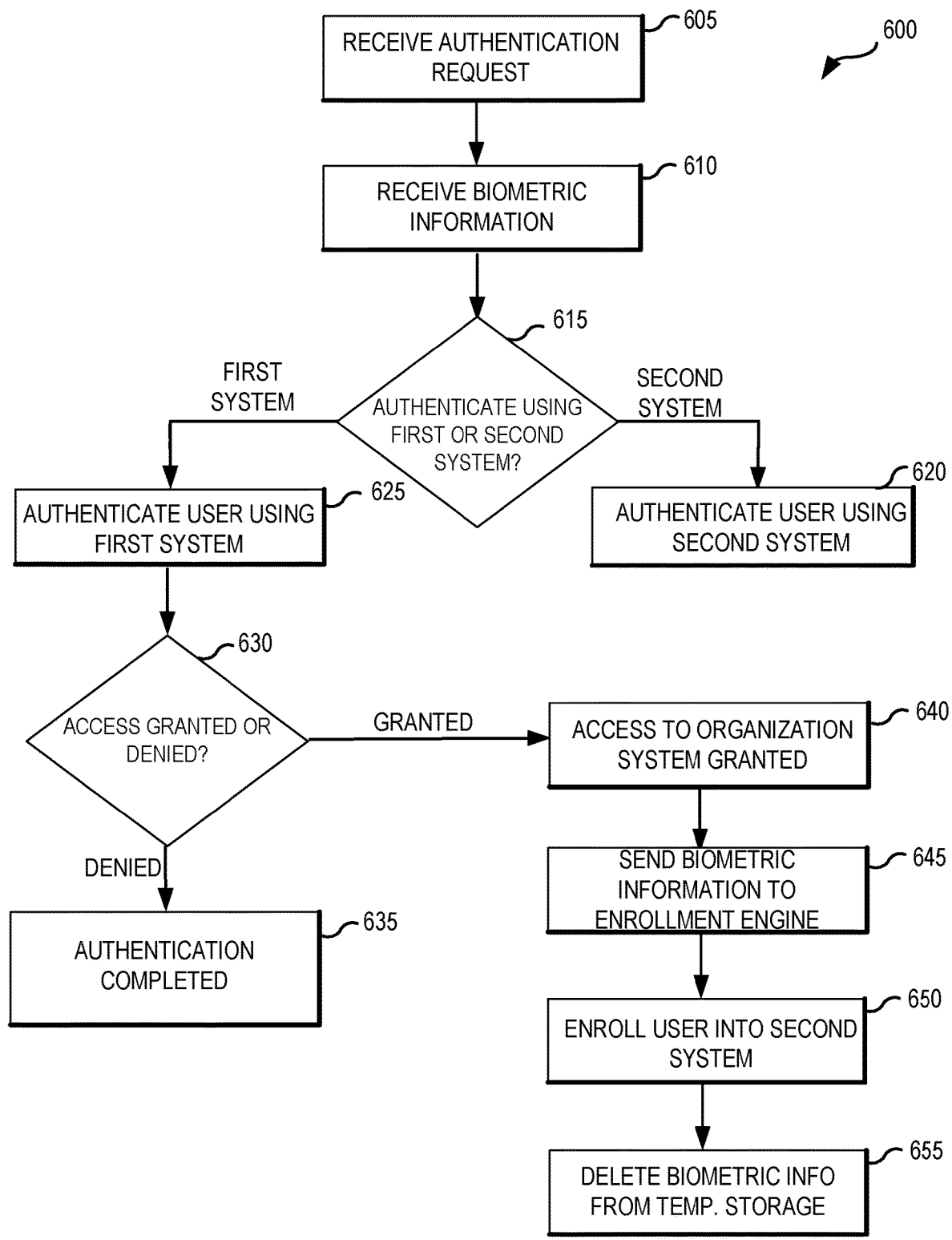
FIG. 6 is a flowchart illustrating a set of operations that can be used during a system upgrade in accordance with various embodiments of the present disclosure.

FIG. 6 is a flowchart illustrating a set of operations 600 that can be used during a system upgrade in accordance with various embodiments of the present disclosure. The operations illustrated in FIG. 6 may be performed by one or more components, devices, or modules such as, but not limited to, computing devices 110A-110M, authentication engine 120, authentication request receiving module 415, enrollment status determination module 420, first system characteristic generation module 425, second system characteristic generation module 430, enrollment engine 435, comparison module 440, authenticator 445, biometric information deletion module 450, and GUI generation module 455 or other components or device. In some embodiments, fewer than all of the steps are performed, whereas in other embodiments additional operations are performed. Moreover, in some embodiments, the operations may be performed in different orders.

Receiving operation 605 receives an authentication request from a user. The authentication request may be a request to login to an account, view an account, make a transfer, or other type of request. Biometric information may be received in receiving operation 610. Biometric information may include one or more of an image, fingerprint, voice sample, etc. In decision operation 615, a determination is made whether the user should be authenticated using the first or the second system. This may be determined by an enrollment status of the user. If the user is enrolled in the second system, the request may be sent to the second system. The user may then be authenticated using the second system in authenticating operation 620. Authenticating operation 620 may compare characteristics of the biometric information derived from the second system with characteristics of previously collected biometric information derived using the second system. If the characteristics match to a threshold, then the user is granted access and if the characteristics do not match to the threshold, the user is denied access and may be required to provide additional credentials.

Alternatively, the authentication request may be directed to the first authentication system if the user is enrolled in the first system but not in the second system. Authenticating operation 625 authenticates the user using the first system. Authenticating operation 625 may compare characteristics of the biometric information derived from the first system with characteristics of previously collected biometric information derived using the first system. Decision operation 630 determines whether access is granted or denied or granted. Access may be granted when the characteristics meet or exceed a threshold. If the characteristics do not meet or exceed the threshold, access is denied and the authentication request is completed in completing operation 635. The user may be required to provide alternative information to confirm the user's identity.

Alternatively, if the characteristics match to the threshold, access to the organization system is granted in accessing operation 640. The user may then view accounts, sell securities, or take other actions allowed by the level of access granted. The biometric information is sent to the enrollment engine in sending operation 645. For example, if the biometric information was an image of the user, the image is sent to the enrollment engine. Enrolling operation 650 receives the biometric information and automatically enrolls the user into the second system by deriving characteristics from the biometric information using the second system and associating these characteristics with the user. Deleting operation deletes the biometric information from the temporary storage 655.

Figure 7:
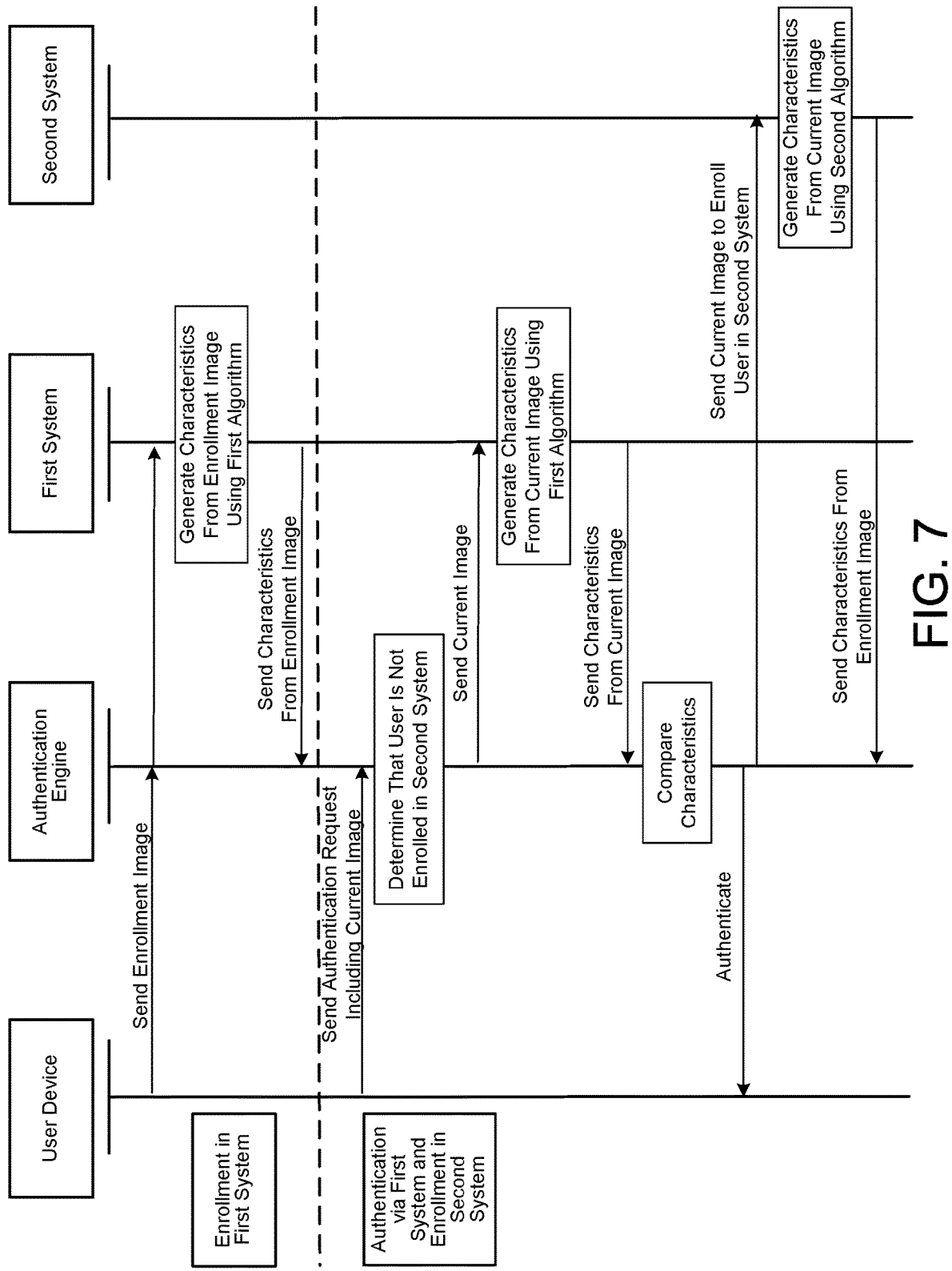
FIG. 7 is a sequence diagram illustrating various interactions between components of a networked-based system in accordance with some embodiments of the present disclosure.

FIG. 7 is a sequence diagram illustrating various interactions between components of a networked-based system in accordance with some embodiments of the present disclosure. The sequence above the dotted line provides an example of enrollment in the first system. The sequence below the dotted line provides an example of authentication using the first system and enrollment into the second system. An enrollment image is sent from a user device to an authentication engine. The authentication engine sends the image to a first system for analysis. The first system generates characteristics from the enrollment image using a first algorithm. The characteristics are sent from the first system to the authentication engine.

The user device sends an authentication request that includes a current image as authentication information to the authentication image. Upon determining that the user is not enrolled in the second system, the authentication engine determines that the user is not enrolled in the second system. The first system generates characteristics of the user from the current image using the first algorithm and communicates the characteristics to the authentication engine. The authentication engine compares the characteristics. If the characteristics match the characteristics determined from the enrollment image, then the user is authenticated. The authentication engine sends the current image to the second system for enrollment in the second system. The second system generates characteristics from the current image using a second algorithm. The characteristics may be sent to the authentication engine and used to enroll the user in the second system.

Computer System Overview

Figure 8:
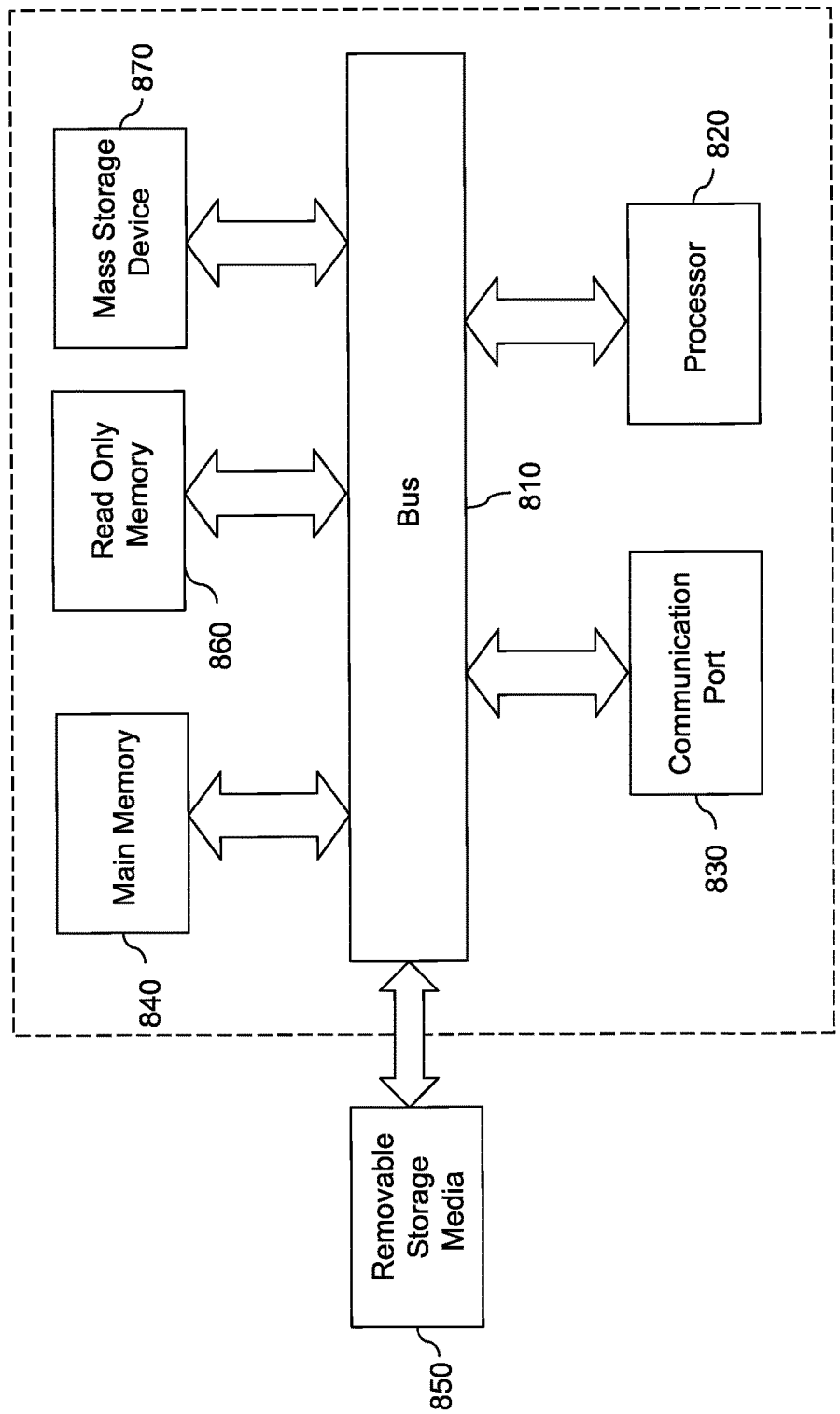
FIG. 8 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system includes a bus 810, at least one processor 820, at least one communication port 830, a main memory 840, a removable storage media 850, a read only memory 860, and a mass storage 870.

Processor(s) 820 can be any known processor, such as, but not limited to, an Intel® Itanium® or Itanium 2® processor(s), or AMD® Opteron® or Athlon MP® processor(s), or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such a Local Area Network (LAN), Wide Area Network (WAN), or any network to which the computer system 800 connects.

Main memory 840 can be Random Access Memory (RAM), or any other dynamic storage device(s) commonly known in the art. Read only memory 860 can be any static storage device(s) such as Programmable Read Only Memory (PROM) chips for storing static information such as instructions for processor 820.

Mass storage 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 820 with the other memory, storage, and communication blocks. Bus 810 can be a PCI/PCI-X or SCSI based system bus depending on the storage devices used.

Removable storage media 850 can be any kind of external hard-drives, floppy drives, IOMEGA® Zip Drives, Compact Disc-Read Only Memory (CD-ROM), Compact Disc-Re-Writable (CD-RW), or Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for upgrading authentication systems. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method comprising:
   receiving, at a device associated with a user, first biometric information in connection with an authentication request from the user;
   determining an enrollment status of the user in a first authentication system and a second authentication system;
   in response to the user being enrolled in the first authentication system and not enrolled in the second authentication system, authenticating, by the first authentication system, the user by comparing first characteristics generated from the first biometric information received in connection with the authentication request with second characteristics generated from second biometric information; and
   automatically enrolling the user into the second authentication system using the first biometric information received in connection with the authentication request by deriving third characteristics of the first biometric information using the second authentication system.

2. The method of claim 1, further comprising:
   in response to the user being enrolled in the second authentication system, storing the third characteristics.

3. The method of claim 1, further comprising:
   deleting the first biometric information received in connection with the authentication request after the third characteristics are derived using the second authentication system.

4. The method of claim 1, further comprising:
   determining whether to authenticate the user using the first authentication system or the second authentication system.

5. The method of claim 1, wherein the first authentication system generates the first characteristics using a first biometric algorithm, wherein the second authentication system generates the third characteristics using a second biometric algorithm, wherein the first biometric algorithm and the second biometric algorithm are incompatible.

6. The method of claim 1, wherein the first biometric information received in connection with the authentication request includes an image of the user.

7. The method of claim 1, wherein the first biometric information received in connection with the authentication request is enrollment information for the second authentication system, wherein the method further comprises authenticating the user with the second authentication system by comparing the third characteristics of the first biometric information with fourth characteristics of biometric information received in connection with a second authentication request.

8. A non-transitory computer-readable medium storing instructions that, when executed by a computing system, cause the computing system to perform operations comprising:
   receiving, at a device associated with a user, first biometric information in connection with an authentication request from the user;
   determining an enrollment status of the user in a first authentication system and a second authentication system;
   in response to the user being enrolled in the first authentication system and not enrolled in the second authentication system, authenticating, by the first authentication system, the user by comparing first characteristics generated from the first biometric information received in connection with the authentication request with second characteristics generated from second biometric information; and automatically enrolling the user into the second authentication system using the first biometric information received in connection with the authentication request by deriving third characteristics of the first biometric information using the second authentication system.

9. The non-transitory computer-readable medium of claim 8, wherein the operations further comprise:
in response to the user being enrolled in the second authentication system, storing the third characteristics.

10. The non-transitory computer-readable medium of claim 8, wherein the operations further comprise:
deleting the first biometric information received in connection with the authentication request after the third characteristics are derived using the second authentication system.

11. The non-transitory computer-readable medium of claim 8, wherein the operations further comprise:
determining whether to authenticate the user using the first authentication system or the second authentication system.

12. The non-transitory computer-readable medium of claim 8, wherein the first authentication system generates the first characteristics using a first biometric algorithm, wherein the second authentication system generates the third characteristics using a second biometric algorithm, wherein the first biometric algorithm and the second biometric algorithm are incompatible.

13. The non-transitory computer-readable medium of claim 8, wherein the first biometric information received in connection with the authentication request includes an image of the user.

14. The non-transitory computer-readable medium of claim 8, wherein the first biometric information received in connection with the authentication request is enrollment information for the second authentication system, wherein the method further comprises authenticating the user with the second authentication system by comparing the third characteristics of the first biometric information with fourth characteristics of biometric information received in connection with a second authentication request.

15. A system comprising:
one or more processors; and
one or more memories storing instructions that, when executed by the one or more processors, cause the system to perform a process comprising:
receiving, at a device associated with a user, first biometric information in connection with an authentication request from the user;
determining an enrollment status of the user in a first authentication system and a second authentication system;
in response to the user being enrolled in the first authentication system and not enrolled in the second authentication system, authenticating, by the first authentication system, the user by comparing first characteristics generated from the first biometric information received in connection with the authentication request with second characteristics generated from second biometric information; and
automatically enrolling the user into the second authentication system using the first biometric information received in connection with the authentication request by deriving third characteristics of the first biometric information using the second authentication system.

16. The system according to claim 15, wherein the process further comprises:
in response to the user being enrolled in the second authentication system, storing the third characteristics.

17. The system according to claim 15, wherein the process further comprises:
deleting the first biometric information received in connection with the authentication request after the third characteristics are derived using the second authentication system.

18. The system according to claim 15, wherein the process further comprises:
determining whether to authenticate the user using the first authentication system or the second authentication system.

19. The system according to claim 15, wherein the first authentication system generates the first characteristics using a first biometric algorithm, wherein the second authentication system generates the third characteristics using a second biometric algorithm, wherein the first biometric algorithm and the second biometric algorithm are incompatible.

20. The system according to claim 15,
wherein the first biometric information received in connection with the authentication request includes an image of the user, and
wherein the first biometric information received in connection with the authentication request is enrollment information for the second authentication system, wherein the method further comprises authenticating the user with the second authentication system by comparing the third characteristics of the first biometric information with fourth characteristics of biometric information received in connection with a second authentication request.

* * * * *